United States Patent
Jia et al.

(10) Patent No.: US 11,836,531 B2
(45) Date of Patent: Dec. 5, 2023

(54) METHOD, DEVICE, AND PROGRAM PRODUCT FOR MANAGING COMPUTING SYSTEM

(71) Applicant: EMC IP Holding Company LLC, Hopkinton, MA (US)

(72) Inventors: Zhen Jia, Shanghai (CN); Zijia Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 521 days.

(21) Appl. No.: 17/178,413

(22) Filed: Feb. 18, 2021

(65) Prior Publication Data
US 2022/0237045 A1 Jul. 28, 2022

(30) Foreign Application Priority Data
Jan. 27, 2021 (CN) .......................... 202110111133.6

(51) Int. Cl.
*G06F 9/50* (2006.01)
*G06N 20/00* (2019.01)

(52) U.S. Cl.
CPC .......... *G06F 9/5044* (2013.01); *G06N 20/00* (2019.01)

(58) Field of Classification Search
CPC ...... G06F 9/5044; G06F 9/5027; G06N 20/00
See application file for complete search history.

(56) References Cited

U.S. PATENT DOCUMENTS

| | | | |
|---|---|---|---|
| 2017/0109205 A1* | 4/2017 | Ahuja | G06F 9/5094 |
| 2020/0117508 A1* | 4/2020 | Subramanian | G06F 40/279 |
| 2020/0118039 A1* | 4/2020 | Kocberber | G06N 5/01 |
| 2020/0249998 A1* | 8/2020 | Che | G06N 20/00 |
| 2020/0250575 A1* | 8/2020 | Ie | G06N 5/043 |
| 2020/0285737 A1* | 9/2020 | Kraus | G06F 21/552 |
| 2021/0081758 A1* | 3/2021 | Zadorojniy | G06N 3/08 |
| 2021/0293992 A1* | 9/2021 | Ayub | G06F 30/27 |

(Continued)

OTHER PUBLICATIONS

Xingyu Lin, Reinforcement Learning without Ground-Truth State, Jul. 2019; Arxiv; (Year: 2019).*

(Continued)

*Primary Examiner* — Dong U Kim
(74) *Attorney, Agent, or Firm* — Ryan, Mason & Lewis, LLP (57) ABSTRACT

A method includes: acquiring a set of operations to be performed on multiple computing units in the computing system; determining, based on the set of operations, the state of the multiple computing units, and an allocation model, an allocation action for allocating the set of operations to the multiple computing units and a reward for the allocation action, wherein the allocation model describes an association relationship among a set of operations, the state of multiple computing units, the allocation action for allocating the set of operations to the multiple computing units, and the reward for the allocation action; receiving an adjustment for the reward in response to determining that a match degree between the reward for the allocation action and a performance index of the computing system after the allocation action is performed satisfies a predetermined condition; and generating, based on the adjustment, training data for updating the allocation model.

20 Claims, 8 Drawing Sheets

(56) References Cited

U.S. PATENT DOCUMENTS

2021/0390458 A1* 12/2021 Blumstein ............... G06F 16/29
2023/0145025 A1*  5/2023 Qureshi ................ G06F 9/5094
                                                      718/100

OTHER PUBLICATIONS

A. Mirhoseini et al., "Device Placement Optimization with Reinforcement Learning," arXiv:1706.04972v2, Jun. 25, 2017, 11 pages.
S. Hosein, "Active Learning: Curious AI Algorithms," https://www.datacamp.com/community/tutorials/active-learning, Feb. 9, 2018, 15 pages.
Z. Liu et al., "A Reinforcement Learning Based Resource Management Approach for Time-critical Workloads in Distributed Computing Environment," 2018 IEEE International Conference on Big Data, Dec. 10-13, 2018, pp. 252-261.

\* cited by examiner

METHOD, DEVICE, AND PROGRAM PRODUCT FOR MANAGING COMPUTING SYSTEM

RELATED APPLICATION(S)

The present application claims priority to Chinese Patent Application No. 202110111133.6, filed Jan. 27, 2021, and entitled "Method, Device, and Program Product for Managing Computing System," which is incorporated by reference herein in its entirety.

FIELD

Implementations of the present disclosure relate to management of a computing system, and more particularly, to a method, a device, and a computer program product for allocating a set of operations to multiple computing units in a computing system.

BACKGROUND

With the development of computer technologies, a computing system can include a large number of computing units. For example, a computing system may include one or more computing devices, and each computing device may include one or more central processing units (CPUs) and graphics processing units (GPUs), among others. Further, a CPU and a GPU may include one or more processor cores. In this case, the computing system will include a large number of computing units, and the computing system can perform a variety of operations. At this point, how to allocate these operations among multiple computing units to improve the overall performance of the computing system becomes an important topic of research.

SUMMARY

Therefore, it is desirable to develop and implement a technical solution to manage a large number of computing units in a computer system in a more effective manner. It is expected that this technical solution can allocate operations to be performed to various computing units in a more convenient and effective manner, thereby improving the operation efficiency of the computing system.

According to a first aspect of the present disclosure, a method for managing a computing system is provided. This method includes: acquiring a set of operations to be performed on multiple computing units in the computing system; determining, based on the set of operations, the state of the multiple computing units, and an allocation model, an allocation action for allocating the set of operations to the multiple computing units and a reward for the allocation action, wherein the allocation model describes an association relationship among the set of operations, the state of multiple computing units, the allocation action for allocating the set of operations to the multiple computing units, and the reward for the allocation action; receiving an adjustment for the reward in response to determining that a match degree between the reward for the allocation action and a performance index of the computing system after the allocation action is performed satisfies a predetermined condition; and generating, based on the adjustment, training data for updating the allocation model.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, illustrative implementations of the present disclosure will be described in more detail with reference to the accompanying drawings. Although the illustrative implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

Figure 1:
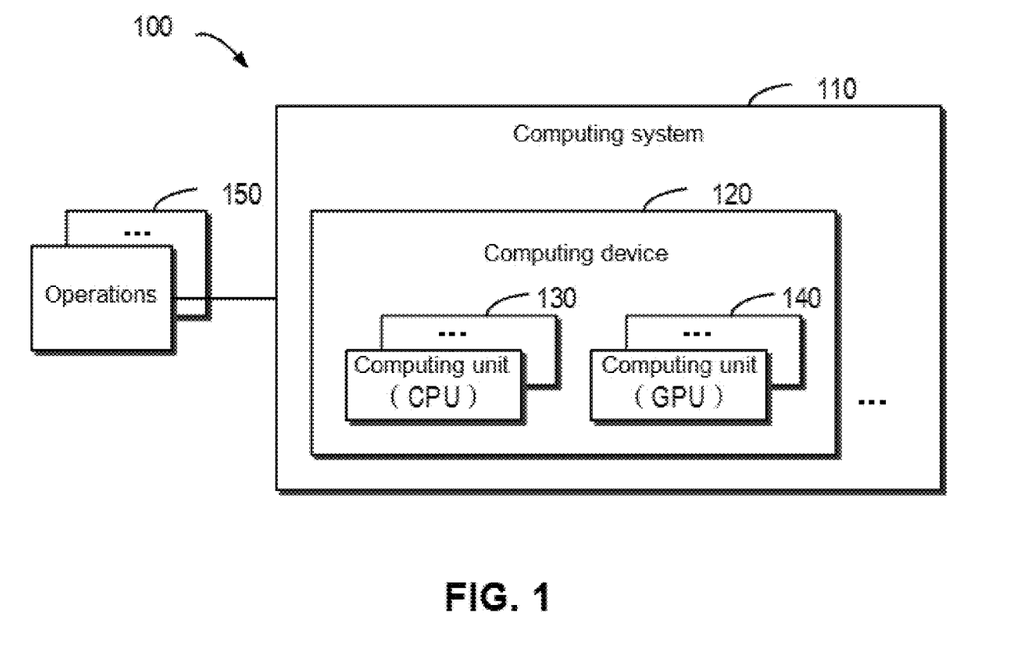
FIG. 1 schematically illustrates a block diagram of an application environment in which example implementations of the present disclosure may be implemented.

For ease of description, an application environment according to an example implementation of the present disclosure will be first described with reference to FIG. 1. FIG. 1 schematically illustrates a block diagram of application environment 100 in which example implementations of the present disclosure may be implemented. As shown in FIG. 1, computing system 110 may include one or more computing devices 120, and each computing device 120 may include multiple types of computing units. For example, computing device 120 may include CPU-type computing units 130 and GPU-type computing units 140. These computing units can collectively serve computing system 110 to process set of operations 150 performed on computing system 110.

At present, technical solutions based on machine learning techniques have been proposed to manage the allocation of workloads to various computing units in a computing system. It will be understood that the needs of people and the state of a computing system are always changing in a workload management environment. If a new computing unit is added to the computing system, the trained model needs to be updated again, which in turn leads to a waste of time and resources. The proposed allocation model based on reinforcement learning involves a huge amount of computation and is thus difficult to be used in a small computing system with limited computing power. Further, the training process may involve a lot of manual labor and it is difficult to combine the already accumulated expert knowledge with reinforcement learning techniques. This leads to the unsatisfactory effect of existing allocation models based on reinforcement learning.

In order to address the aforementioned defects, a technical solution for managing a computing system is provided according to an example implementation of the present disclosure. Specifically, some embodiments construct an initial allocation model based on reinforcement learning techniques. During the further training of this initial allocation model, a man-machine interaction process is introduced in order to manually intervene in the training process based on the knowledge of technical experts, and thus generate training data that is more useful for improving the performance of the computing system. In this way, the machine learning process can be combined with human experience to acquire a more accurate and effective training model.

Figure 2:
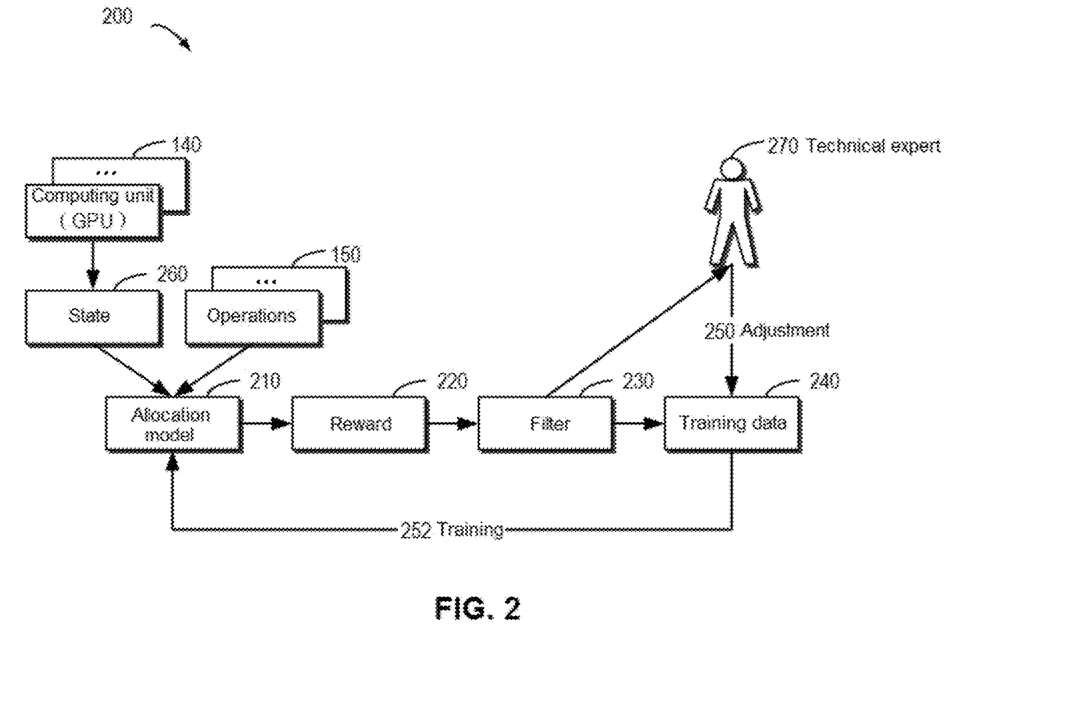
FIG. 2 schematically illustrates a block diagram of a process for managing a computing system according to example implementations of the present disclosure.

Hereinafter, an overview according to an example implementation of the present disclosure will be first provided with reference to FIG. 2. FIG. 2 schematically illustrates a block diagram of process 200 for managing computing system 110 according to example implementations of the present disclosure. For ease of description, a technical solution for managing multiple computing units in a computing system will be described in the context of the present disclosure using GPUs as an example of computing units. According to an example implementation of the present disclosure, a computing unit may include, but is not limited to, a computing device, a CPU, a GPU, and a processor core of a CPU and a GPU, among others. As shown in FIG. 2, state 260 of multiple computing units 140 (e.g., including n computing units) can be acquired, and set of operations 150 (e.g., including m operations) to be allocated can be acquired. Initially trained allocation model 210 can be obtained based on reinforcement learning techniques, and state 260 of the multiple computing units 140 and set of operations 150 can be input to allocation model 210. Allocation model 210 can then output an allocation action for allocating set of operations 150 to multiple computing units 140 and reward 220 related to this action.

According to an example implementation of the present disclosure, filter 230 can be used to determine whether reward 220 is consistent with the performance index expected to be obtained in computing system 110. If the two are not consistent, it is feasible to ask technical expert 270 for help. Adjustment 250 from technical expert 270 can be received to generate training data 240 for a subsequent further training process. If the two are consistent, training data 240 can be generated directly based on reward 220. Training data 240 generated here can be used to train 252 allocation model 210 in the subsequent process. With the example implementation of the present disclosure, filter 230 can be implemented based on active learning techniques, thereby significantly reducing human labor in the training process. In this way, a manual intervention process can be initiated when allocation model 210 fails to satisfy the needs of an administrator of computing system 110, thereby making full use of the experience of technical expert 270 to improve the accuracy of allocation model 210.

Figure 3:
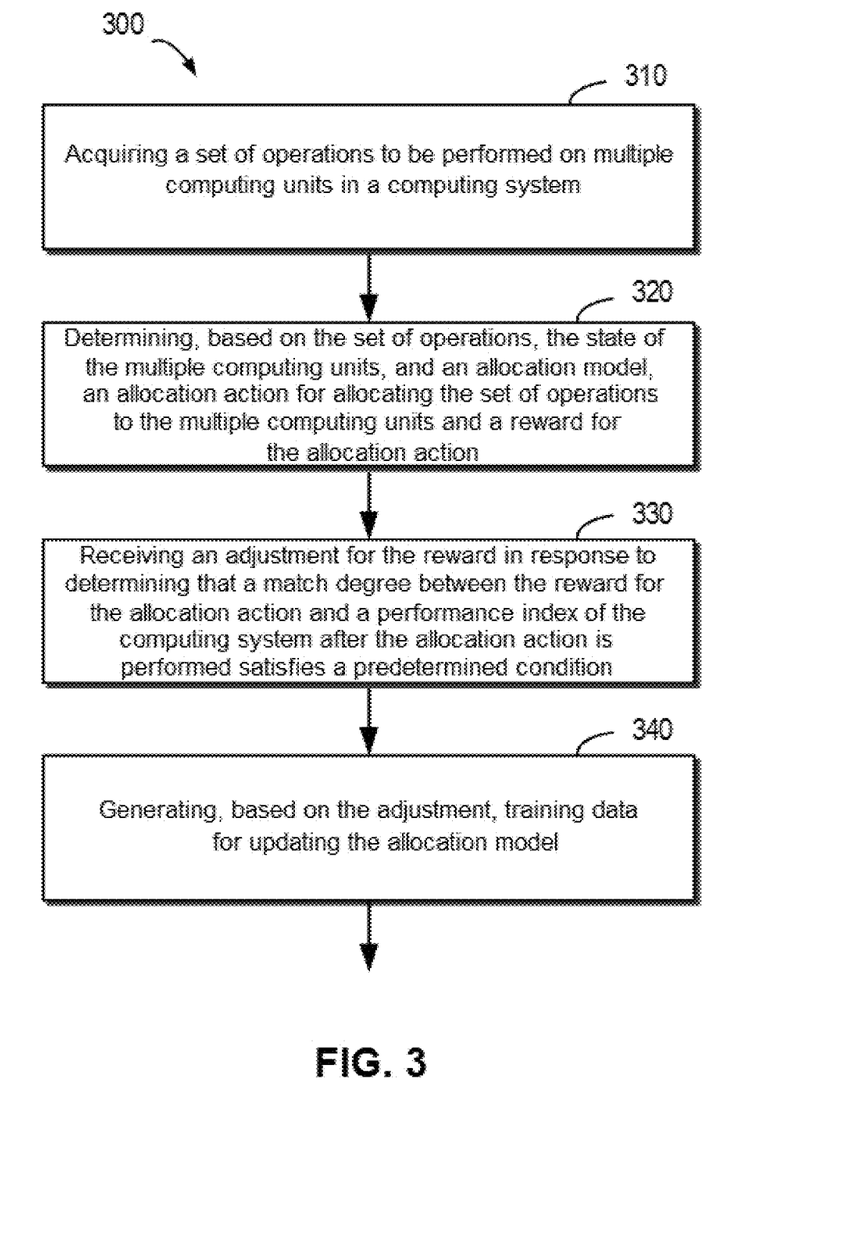
FIG. 3 schematically illustrates a flow chart of a method for managing a computing system according to example implementations of the present disclosure.

Hereinafter, the steps of a method according to an example implementation of the present disclosure will be described with reference to FIG. 3. FIG. 3 schematically illustrates a flow chart of method 300 for managing computing system 110 according to example implementations of the present disclosure. At block 310, set of operations 150 to be performed on multiple computing units in computing system 110 is acquired. Computing system 110 may include n computing units, and the multiple computing units may be represented by symbol CU: CU=(U1, U2, . . . , Un).

According to an example implementation of the present disclosure, an operation may have different granularities. For example, a set of operations may include a code segment, and at this point each operation may be a line of code. For another example, a set of operations may include a task, and at this point each operation may include a function invoked by that task, and so on. Symbol OP can be used to represent a set of operations with the number being m: OP=(O1, O2, . . . , Om). Set of operations 150 to be performed on multiple computing units 140 can be acquired from a list of tasks of computing system 110.

At block 320, based on set of operations 150, state 260 of multiple computing units 140, and allocation model 210, an allocation action for allocating set of operations 150 to multiple computing units 140 and a reward for this allocation action are determined. Here, state 260 may include indexes for various aspects of various computing units, for example, processor utilization, the number of operations in a waiting queue, processor frequency, etc. The state of each computing unit can be represented as a multidimensional vector, which in turn forms a vector of a higher dimension for representing overall state 260 of all the multiple computing units.

According to an example implementation of the present disclosure, allocation model 210 may be a machine learning model initially trained based on reinforcement learning techniques. A variety of training techniques that have been developed so far and/or are to be developed in the future may be used to obtain allocation model 210. Allocation model 210 can describe an association relationship among a set of operations, the state of multiple computing units, an allocation action for allocating the set of operations to the multiple computing units, and a reward for the allocation action. The allocation action can be represented based on vectors: AC=(P1, P2, ..., Pm). The ith dimension Pi in AC can indicate to which computing unit the ith operation in the set of operations is allocated. For example, the value range of Pi can be defined as [1, n], and at this point the ith operation can be allocated to any of the n computing units. For example, the allocation action (1, n, ..., 3) can indicate: allocating the 1st operation in the set of operations to the 1st computing unit, allocating the 2nd operation to the nth computing unit, ..., and allocating the mth operation in the set of operations to the 3rd computing unit.

According to an example implementation of the present disclosure, an initial action space of allocation actions can be constructed based on a variety of approaches. For example, an action space representing all the allocation possibilities may be constructed, and at this point, the action space would include nm allocation actions. The action space can be constructed based on a random approach, and alternatively and/or additionally, the action space can be constructed based on expert knowledge for allocating a set of operations to multiple computing units. Specifically, an allocation action that has been validated as contributing to improving the overall performance of computing system 110 can be selected from historical allocation actions to construct the action space. For example, operations can be preferentially allocated to computing units that are in an idle state, various operations can be allocated to multiple computing units as evenly as possible, allocating too many operations to one computing unit can be avoided, and so on. In the case where the action space has been determined, the reward for each action in the action space can be acquired to obtain initially trained allocation model 210.

Figure 4:
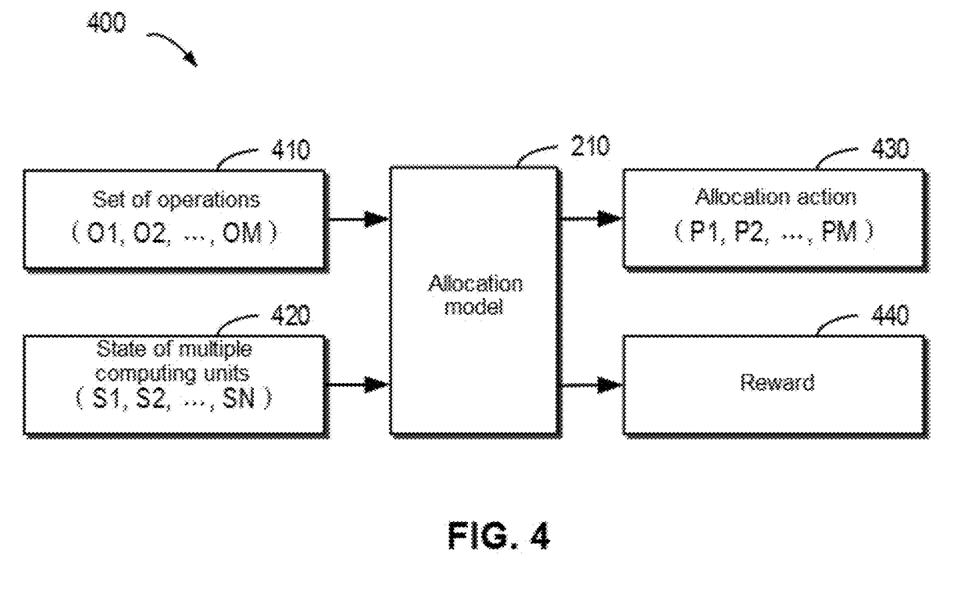
FIG. 4 schematically illustrates a block diagram of a process of using an allocation model that is used to manage a computing system according to example implementations of the present disclosure.

Hereinafter, more details about allocation model 210 will be described with reference to FIG. 4. FIG. 4 schematically illustrates a block diagram of process 400 of using an allocation model that is used to manage a computing system according to example implementations of the present disclosure. Initially trained allocation model 210 can be acquired based on marked training data. Following that, initially trained allocation model 210 can be used to predict rewards corresponding to allocation actions that can be performed. As shown in FIG. 4, set of operations 410 and state 420 of multiple computing units can be input to allocation model 210. State 420 illustratively includes states S1, S2 and so on for respective ones of a plurality of computing units, denoted in the figure as N computing units. In other description herein, lower case variables n and m are used in place of the respective upper case variables N and M of FIG. 4. At this point, allocation model 210 can predict allocation action 430 and corresponding reward 440.

Figure 5:
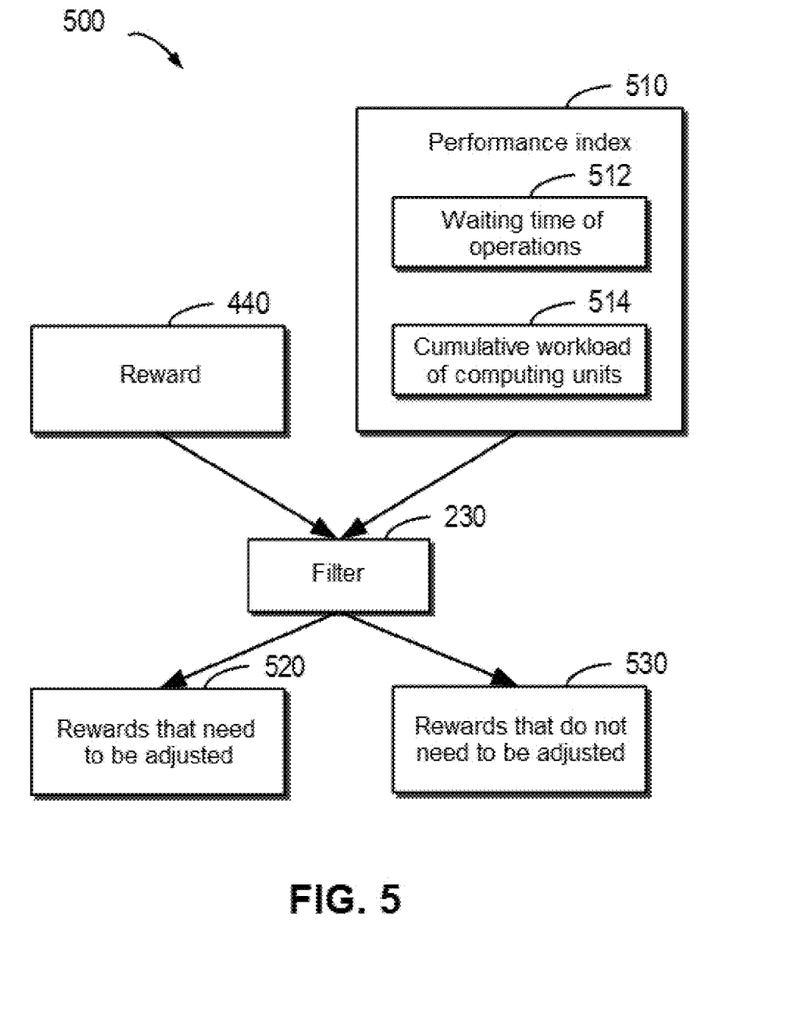
FIG. 5 schematically illustrates a block diagram of a process for determining a reward that needs to be adjusted according to example implementations of the present disclosure.

According to an example implementation of the present disclosure, allocation action 430 can be performed in computing system 110 to determine a performance index of computing system 110 after the allocation action is performed. Alternatively and/or additionally, a simulator can be used to simulate performing allocation action 430 in computing system 110 and thereby acquire a prediction of the corresponding performance index. Hereinafter, more details related to a performance index will be described with reference to FIG. 5. FIG. 5 schematically illustrates a block diagram of process 500 for determining a reward that needs to be adjusted according to example implementations of the present disclosure. As shown in FIG. 5, performance index 510 may include waiting time 512 of operations in a set of operations. The waiting time of the set of operations may be represented as a vector, and the higher the waiting time, the lower the overall performance index 510. Performance index 510 may further include cumulative workload 514 of computing units in the multiple computing units. The cumulative workload of the multiple computing units may be represented as a vector, and the higher the cumulative workload, the lower the overall performance index 510.

Further, it can be determined, based on a comparison between reward 440 and the performance index, whether manual intervention is needed. Returning to FIG. 3, at block 330, adjustment 250 for reward 440 is received in response to determining that a match degree between reward 440 for allocation action 430 and the performance index of computing system 110 after allocation action 430 is performed satisfies a predetermined condition. According to an example implementation of the present disclosure, filter 230 can be used to distinguish rewards that need to be adjusted and those that do not.

Specifically, filter 230 can be set based on a direction of the reward and a direction of change in the performance index. For example, reward 440 may include a positive reward and a negative reward. A positive reward is used to indicate that the allocation action can run in a direction that helps improve the performance of computing system 110, and a negative reward is used to indicate that the allocation action can run in a direction that is harmful to improving the performance of computing system 110. According to an example implementation of the present disclosure, if the reward is a positive reward and the direction of change in the performance index is "decrease," it is considered that reward 440 needs to be adjusted. For another example, if the reward is a negative reward and the direction of change in the performance index is "increase," it is also considered that reward 440 needs to be adjusted. Filter 230 can determine, based on the above conditions, which rewards 520 need to be adjusted.

According to an example implementation of the present disclosure, rewards 520 that need to be adjusted can be provided to technical expert 270 so that technical expert 270 can perform adjustment 250 based on his or her own experience. Assuming that the value interval of a reward is [−1, 1], technical expert 270 can adjust the value of the received reward so that the adjusted reward can truly reflect whether the allocation action will be able to manage computing system 110 in a direction that improves the performance of computing system 110. For example, if the allocation action results in a decrease in performance index 510 and the reward is positive, the value of the reward can be reduced (e.g., setting the reward to a negative reward). For another example, if the allocation action results in an increase in performance index 510 and the reward is negative, the value of the reward can be increased (e.g., setting the reward to a positive reward).

According to an example implementation of the present disclosure, technical expert 270 can also modify the action space of allocation actions. For example, an allocation action that severely degrades the performance of computing system 110 (e.g., an action that allocates multiple operations to the same computing unit) can be deleted from the existing action space, and for another example, a new allocation action that can improve the performance of computing system 110 (e.g., an action that allocates multiple operations equally to multiple computing units) can be added to the action space.

With the example implementation of the present disclosure, it is possible to use the experience of technical expert 270 to re-provide marked data when needed, and thus use the new marked data to train allocation model 210. The process of determining rewards 520 that need to be adjusted has been described above, and in some cases, filter 230 can determine rewards 530 that do not need to be adjusted based on the conditions described above. At this point, rewards 530 can be used directly to generate training data.

Hereinafter, the description will return to FIG. 3 to describe how to generate training data 240 based on adjustment 250. At block 340 in FIG. 3, training data 240 for updating allocation model 210 is generated based on adjustment 250. Specifically, training data 240 can be generated using the adjusted rewards, as well as set of operations 410, state 420 of the multiple computing units, and allocation action 430. For another example, training data 240 can be generated using the allocation actions newly added by technical expert 270 and the corresponding rewards in combination with set of operations 410 and state 420 of the multiple computing units.

Figure 6:
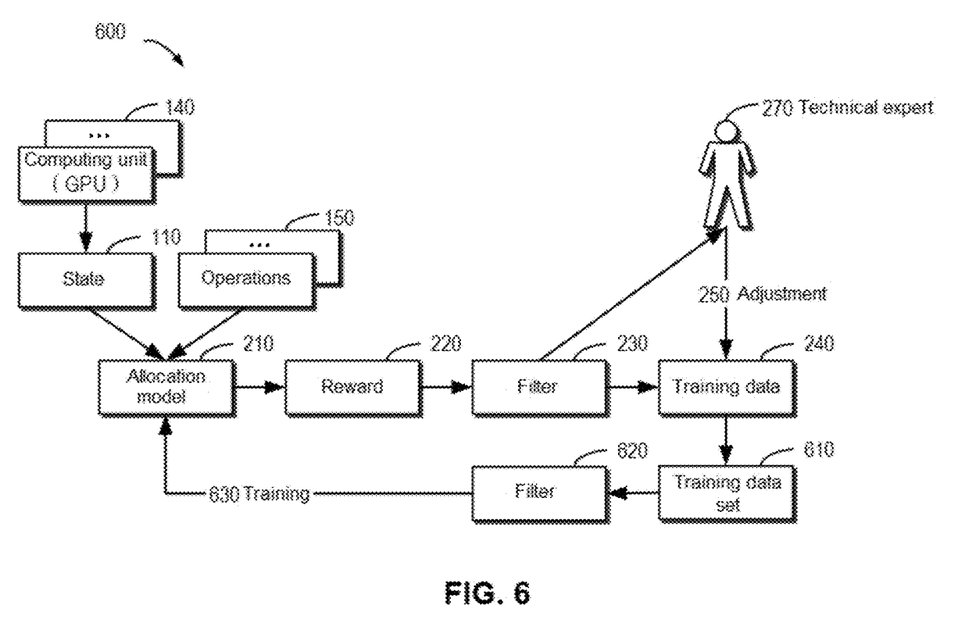
FIG. 6 schematically illustrates a block diagram of a process for managing a computing system according to example implementations of the present disclosure.

According to an example implementation of the present disclosure, method 300 described above can be performed iteratively in multiple rounds to generate multiple pieces of training data 240, and generated training data 240 can be processed in batch. FIG. 6 schematically illustrates a block diagram of process 600 for managing computing system 110 according to example implementations of the present disclosure. As shown in FIG. 6, training data 240 generated each time can be stored into training data set 610, and the training process as shown by arrow 630 can be initiated when the amount of training data in training data set 610 reaches a predetermined amount.

According to an example implementation of the present disclosure, filter 620 can be used to process training data set 610 so as to speed up the training process. Specifically, the filtering operation can be performed based on differences between various pieces of training data in training data set 610 and historical training data. It will be understood that allocation model 210 is a model that has undergone initial training, and thus allocation model 210 has accumulated knowledge related to the historical training data used in the initial training. When performing subsequent training, it is more desirable to use training data that is different from the historical training data to obtain new knowledge in other aspects. Thus, filter 620 can be used to filter out training data that is similar to the historical training data from training data set 610.

Figure 7:
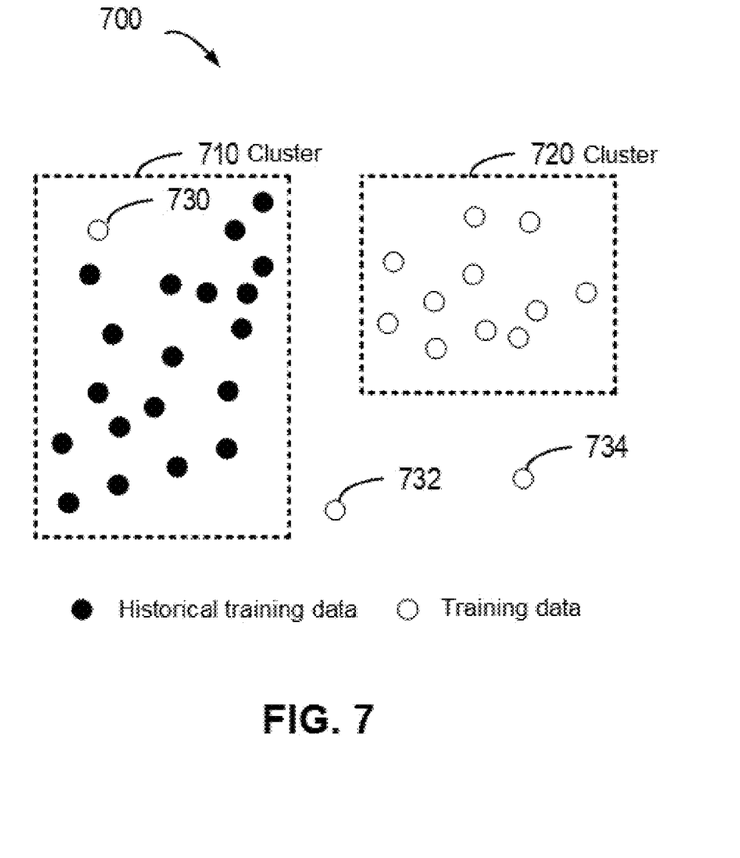
FIG. 7 schematically illustrates a block diagram of a process for filtering a training data set according to example implementations of the present disclosure.

Hereinafter, more details about the filtering process will be described with reference to FIG. 7. FIG. 7 schematically illustrates a block diagram of process 700 for filtering training data set 610 according to example implementations of the present disclosure. As shown in FIG. 7, the dots indicate historical training data while the circles indicate new training data in training data set 610. Various training data can be classified (for example, based on spatial distance), and the similarity between each piece of training data can be determined according to the obtained clusters. In FIG. 7, a large amount of historical training data is classified to cluster 710 and a large amount of new training data is classified to cluster 720.

According to an example implementation of the present disclosure, if a difference between training data and historical training data is below a predetermined threshold, it can be considered that the allocation scenario represented by that training data have been covered by the historical training data. As shown in FIG. 7, training data 730 is classified into cluster 710, and there is no need to use training data 730 to re-train allocation model 210 since allocation model 210 currently has included the knowledge covered by training data 730. In other words, training data 730 can be deleted from training data set 610.

According to an example implementation of the present disclosure, the training data can be retained if it is determined that the difference between the training data and the historical training data exceeds the predetermined threshold. In FIG. 7, the differences between training data in cluster 720 as well as training data 732 and 734 and the historical training data exceed the predetermined threshold, and thus these training data can be retained. It will be understood that some training data in training data set 610 may be abnormal due to marking errors and/or other errors. These abnormal data cannot be used for training in a direction that helps improve the performance of computing system 110, and therefore, it is necessary to delete these abnormal data. Further filtering can be performed on the retained training data. For example, the abnormal data can be removed based on the similarities between the retained training data.

In FIG. 7, a large amount of training data is classified into cluster 720, which indicates that these training data have a similarity and can reflect the distribution situation not covered by historical training data. Thus, the training data in cluster 720 can be retained. That is, multiple pieces of training data that meet the following conditions can be retained: there are differences between the multiple pieces of training data and the historical training data; and there are similarities between the multiple pieces of training data. According to an example implementation of the present disclosure, training data 732 and 734 outside of cluster 720 can be removed because they do not have a similarity. Alternatively and/or additionally, training data 732 and 734 can be further submitted to technical expert 270 for manual confirmation as to whether such training data should be removed. With the example implementation of the present disclosure, training data that does not contribute to improving the performance of computing system 110 can be deleted from training data set 610. In this way, the training process can be sped up and the training efficiency can be improved.

According to an example implementation of the present disclosure, a portion of the training data that is similar to the historical training data can be retained to ensure the integrity of training data set 610. Assuming that it is determined that training data set 610 includes 1000 pieces of training data similar to the historical training data, a predetermined percentage (e.g., 50% or other value) of the training data can be deleted from training data set 610. With the example implementation of the present disclosure, on one hand, the number of training data can be reduced to improve the training efficiency, and on the other hand, the accuracy of allocation model 210 can be improved based on enhancement of allocation knowledge associated with the historical training data.

According to an example implementation of the present disclosure, method 300 described above can be performed periodically until the training process satisfies a predetermined convergence condition. According to an example implementation of the present disclosure, method 300 can be re-executed when there is a change in the number of computing units in computing system 110. Alternatively and/or additionally, method 300 can be re-executed when there is a change in the needs of the administrator of computing system 110. With the example implementation of the present disclosure, it is not necessary to re-train a new allocation model, but rather, the training efficiency can be improved based on active learning and expert knowledge from technical experts.

The process for determining training data set 610 and updating allocation model 210 based on training data set 610 has been described above. Further, updated allocation model 210 can be used to predict a new allocation action to allocate a set of operations newly received to the multiple computing units in computing system 110. According to an example implementation of the present disclosure, another set of operations to be performed on the multiple computing units can be received. Another allocation action for allocating the other set of operations to the multiple computing units can be determined based on the other set of operations, the current state of the multiple computing units, and the updated allocation model.

According to an example implementation of the present disclosure, the allocation model is a model updated using training data set 610, and this allocation model may include the latest expert knowledge and may cover more comprehensive allocation scenarios. At this point, the determined allocation action may cause computing system 110 to operate in a direction that is more helpful for improving the performance. The determined allocation action can be performed in computing system 110 so as to make full use of available resources in the multiple computing units in computing system 110 in an optimized manner.

Examples of the method according to the present disclosure have been described in detail above with reference to FIGS. 2 to 7, and implementations of a corresponding apparatus will be described below. According to an example implementation of the present disclosure, an apparatus for managing a computing system is provided, including: an acquisition module configured to acquire a set of operations to be performed on multiple computing units in the computing system; a determination module configured to determine, based on the set of operations, the state of the multiple computing units, and an allocation model, an allocation action for allocating the set of operations to the multiple computing units and a reward for the allocation action, wherein the allocation model describes an association relationship among the set of operations, the state of multiple computing units, the allocation action for allocating the set of operations to the multiple computing units, and the reward for the allocation action; a receiving module configured to receive an adjustment for the reward in response to determining that a match degree between the reward for the allocation action and a performance index of the computing system after the allocation action is performed satisfies a predetermined condition; and a generation module configured to generate, based on the adjustment, training data for updating the allocation model. According to an example implementation of the present disclosure, this apparatus further includes modules for performing other steps in method 300 described above.

Figure 8:
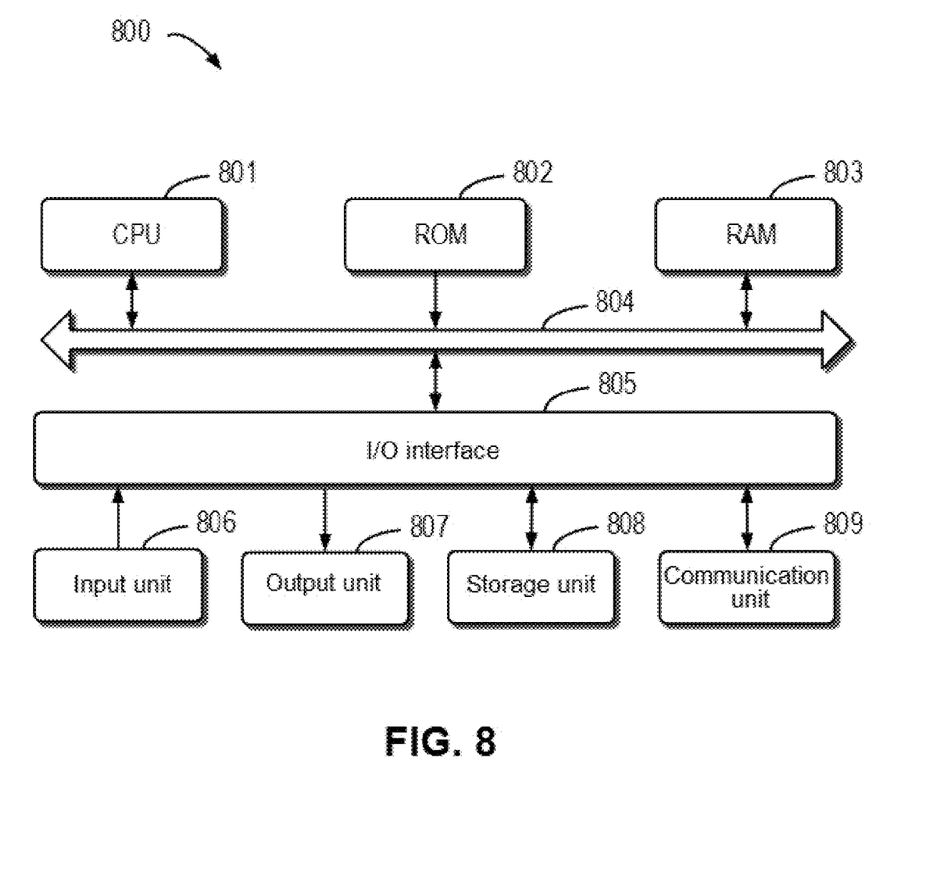
FIG. 8 schematically illustrates a block diagram of a device for managing a computing system according to example implementations of the present disclosure.

FIG. 8 schematically illustrates a block diagram of device 800 for managing data patterns according to example implementations of the present disclosure. As shown in the figure, device 800 includes central processing unit (CPU) 801 that may perform various appropriate actions and processing according to computer program instructions stored in read-only memory (ROM) 802 or computer program instructions loaded from storage unit 808 into random access memory (RAM) 803. In RAM 803, various programs and data required for the operation of device 800 may also be stored. CPU 801, ROM 802, and RAM 803 are connected to one another through bus 804. Input/output (I/O) interface 805 is also connected to bus 804.

Multiple components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as method 300, may be performed by CPU 801. For example, in some implementations, method 300 may be implemented as a computer software program that is tangibly included in a machine-readable medium, such as storage unit 808. In some implementations, part or all of the computer program may be loaded in and/or installed to device 800 through ROM 802 and/or communication unit 809. One or more steps of method 300 described above may be performed when the computer program is loaded into RAM 803 and executed by CPU 801. Alternatively, in other implementations, CPU 801 may also be configured in any other suitable manner to implement the above processes/methods.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to execute a method for managing a computer system. The method includes: acquiring a set of operations to be performed on multiple computing units in the computing system; determining, based on the set of operations, the state of the multiple computing units, and an allocation model, an allocation action for allocating the set of operations to the multiple computing units and a reward for the allocation action, wherein the allocation model describes an association relationship among the set of operations, the state of multiple computing units, the allocation action for allocating the set of operations to the multiple computing units, and the reward for the allocation action; receiving an adjustment for the reward in response to determining that a match degree between the reward for the allocation action and a performance index of the computing system after the allocation action is performed satisfies a predetermined condition; and generating, based on the adjustment, training data for updating the allocation model.

According to an example implementation of the present disclosure, the allocation model is generated based on expert knowledge used to allocate a set of operations to multiple computing units.

According to an example implementation of the present disclosure, the predetermined condition includes: the direction of the reward is opposite to the direction of change in the performance index.

According to an example implementation of the present disclosure, the performance index includes at least any one of the following: a waiting time of operations in the set of operations; and a cumulative workload of computing units in the multiple computing units.

According to an example implementation of the present disclosure, receiving the adjustment includes: receiving the adjustment from a technical expert managing the computing system, and wherein the adjustment further includes an adjustment for an action space of the allocation model.

According to an example implementation of the present disclosure, the method further includes: generating, based on the reward and in response to determining that the match degree does not satisfy the predetermined condition, training data for updating the allocation model.

According to an example implementation of the present disclosure, the method further includes at least any one of the following: retaining the training data in response to determining that a difference between the training data and historical training data used to train the allocation model exceeds a predetermined threshold; and deleting the training data in response to determining that the difference does not exceed the predetermined threshold.

According to an example implementation of the present disclosure, the allocation model is implemented based on reinforcement learning, and the computing units include graphics processing units in the computing system.

According to an example implementation of the present disclosure, the method further includes: acquiring another set of operations to be performed on the multiple computing units; determining, based on the other set of operations, the state of the multiple computing units, and the updated allocation model, another allocation action for allocating the other set of operations to the multiple computing units; and performing the other allocation action in the computing system.

According to an example implementation of the present disclosure, the method further includes: updating the allocation model using the training data.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, and to otherwise enable persons of ordinary skill in the art to understand the implementations disclosed here.

What is claimed is:

1. A method for managing a computing system, including:
  acquiring a set of operations to be performed on multiple computing units in the computing system;
  determining, based on the set of operations, the state of the multiple computing units, and an allocation model, an allocation action for allocating the set of operations to the multiple computing units and a reward for the allocation action, wherein the allocation model is implemented based on reinforcement learning and describes an association relationship among the set of operations, the state of multiple computing units, the allocation action for allocating the set of operations to the multiple computing units, and the reward for the allocation action;
  filtering the reward;
  receiving an adjustment for the reward from a source external to the allocation model in response to the filtering determining that a match degree between the reward for the allocation action and a performance index of the computing system after the allocation action is performed satisfies a predetermined condition; and
  generating, based on the adjustment, training data for updating the allocation model.

2. The method according to claim 1, wherein the allocation model is generated based on existing knowledge used to allocate a set of operations to multiple computing units.

3. The method according to claim 1, wherein the predetermined condition includes: the direction of the reward is opposite to the direction of change in the performance index.

4. The method according to claim 3, wherein the performance index includes at least any one of the following:
  a waiting time of operations in the set of operations; and
  a cumulative workload of computing units in the multiple computing units.

5. The method according to claim 1, wherein receiving the adjustment includes: receiving the adjustment from a user managing the computing system, and wherein the adjustment further includes an adjustment for an action space of the allocation model.

6. The method according to claim 1, further including: generating, based on the reward and in response to determining that the match degree does not satisfy the predetermined condition, training data for updating the allocation model.

7. The method according to claim 1, further including at least any one of the following:
  retaining the training data in response to determining that a difference between the training data and historical training data used to train the allocation model exceeds a predetermined threshold; and
  deleting the training data in response to determining that the difference does not exceed the predetermined threshold.

8. The method according to claim 7, further including: updating the allocation model using the training data.

9. The method according to claim 8, further including:
  acquiring another set of operations to be performed on the multiple computing units;
  determining, based on the other set of operations, the state of the multiple computing units, and the updated allocation model, another allocation action for allocating the other set of operations to the multiple computing units; and
  performing the other allocation action in the computing system.

10. The method according to claim 1, wherein the computing units include graphics processing units in the computing system.

11. An electronic device, including:
  at least one processor;
  a volatile memory; and
  a memory coupled to the at least one processor, wherein the memory has instructions stored therein that, when executed by the at least one processor, cause the electronic device to perform a method for managing a computing system, the method including:
  acquiring a set of operations to be performed on multiple computing units in the computing system;
  determining, based on the set of operations, the state of the multiple computing units, and an allocation model, an allocation action for allocating the set of operations to the multiple computing units and a reward for the allocation action, wherein the allocation model is implemented based on reinforcement learning and describes an association relationship among the set of operations, the state of multiple computing units, the allocation action for allocating the set of operations to the multiple computing units, and the reward for the allocation action;

filtering the reward;

receiving an adjustment for the reward from a source external to the allocation model in response the filtering to determining that a match degree between the reward for the allocation action and a performance index of the computing system after the allocation action is performed satisfies a predetermined condition; and generating, based on the adjustment, training data for updating the allocation model.

12. The electronic device according to claim 11, wherein the allocation model is generated based on existing knowledge used to allocate a set of operations to multiple computing units.

13. The electronic device according to claim 11, wherein the predetermined condition includes: the direction of the reward is opposite to the direction of change in the performance index.

14. The electronic device according to claim 13, wherein the performance index includes at least any one of the following:

a waiting time of operations in the set of operations; and a cumulative workload of computing units in the multiple computing units.

15. The electronic device according to claim 11, wherein receiving the adjustment includes: receiving the adjustment from a user managing the computing system, and wherein the adjustment further includes an adjustment for an action space of the allocation model.

16. The electronic device according to claim 11, wherein the method further includes: generating, based on the reward and in response to determining that the match degree does not satisfy the predetermined condition, training data for updating the allocation model.

17. The electronic device according to claim 11, wherein the method further includes at least any one of the following:

retaining the training data in response to determining that a difference between the training data and historical training data used to train the allocation model exceeds a predetermined threshold; and deleting the training data in response to determining that the difference does not exceed the predetermined threshold.

18. The electronic device according to claim 17, wherein the computing units include graphics processing units in the computing system, and wherein the method further includes:

updating the allocation model using the training data.

19. The electronic device according to claim 18, wherein the method further includes:

acquiring another set of operations to be performed on the multiple computing units;

determining, based on the other set of operations, the state of the multiple computing units, and the updated allocation model, another allocation action for allocating the other set of operations to the multiple computing units; and performing the other allocation action in the computing system.

20. A computer program product that is tangibly stored on a non-transitory computer-readable medium and includes machine-executable instructions, wherein the machine-executable instructions are used to perform a method for managing a computing system, the method including:

acquiring a set of operations to be performed on multiple computing units in the computing system;

determining, based on the set of operations, the state of the multiple computing units, and an allocation model, an allocation action for allocating the set of operations to the multiple computing units and a reward for the allocation action, wherein the allocation model is implemented based on reinforcement learning and describes an association relationship among the set of operations, the state of multiple computing units, the allocation action for allocating the set of operations to the multiple computing units, and the reward for the allocation action;

filtering the reward;

receiving an adjustment for the reward from a source external to the allocation model in response to the filtering determining that a match degree between the reward for the allocation action and a performance index of the computing system after the allocation action is performed satisfies a predetermined condition; and generating, based on the adjustment, training data for updating the allocation model.

* * * * *

UNITED STATES PATENT AND TRADEMARK OFFICE
CERTIFICATE OF CORRECTION

PATENT NO. : 11,836,531 B2
APPLICATION NO. : 17/178413
DATED : December 5, 2023
INVENTOR(S) : Zhen Jia et al.

It is certified that error appears in the above-identified patent and that said Letters Patent is hereby corrected as shown below:

In the Claims

Claim 11, Column 15, Lines 7-8 please delete "in response the filtering to" and insert therefor --in response to the filtering--

Signed and Sealed this
Second Day of July, 2024

Katherine Kelly Vidal
*Director of the United States Patent and Trademark Office*